(12) United States Patent
Na

(10) Patent No.: US 9,804,442 B2
(45) Date of Patent: Oct. 31, 2017

(54) DOUBLE-SIDED EMISSION TYPE DISPLAY DEVICE

(71) Applicant: SAMSUNG ELECTRONICS CO., LTD., Suwon-si (KR)

(72) Inventor: Jeong Shan Na, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 14/643,387

(22) Filed: Mar. 10, 2015

(65) Prior Publication Data

US 2015/0253624 A1    Sep. 10, 2015

(30) Foreign Application Priority Data

Mar. 10, 2014    (KR) ........................ 10-2014-0027983

(51) Int. Cl.
| | | |
|---|---|---|
| G09F 13/04 | (2006.01) |
| G09F 13/08 | (2006.01) |
| G02F 1/1335 | (2006.01) |
| F21V 5/04 | (2006.01) |
| G02F 1/1333 | (2006.01) |
| F21Y 103/10 | (2016.01) |
| F21Y 115/10 | (2016.01) |

(52) U.S. Cl.
CPC ......... *G02F 1/133603* (2013.01); *F21V 5/04* (2013.01); *F21Y 2103/10* (2016.08); *F21Y 2115/10* (2016.08); *G02F 2001/133342* (2013.01); *G02F 2001/133607* (2013.01); *G02F 2001/133613* (2013.01)

(58) Field of Classification Search
CPC ... G02F 1/133603; G02F 2001/133342; G02F 2001/133607; G02F 2001/133613; G09F 2013/222
See application file for complete search history.

(56) References Cited

U.S. PATENT DOCUMENTS

| | | | | |
|---|---|---|---|---|
| 2004/0246402 A1* | 12/2004 | Yu | ..................... | G02F 1/133615 349/61 |
| 2005/0207156 A1* | 9/2005 | Wang | ........................ | F21K 9/00 362/240 |
| 2010/0171904 A1* | 7/2010 | Hung | ................ | G02F 1/133603 349/67 |
| 2010/0208171 A1* | 8/2010 | Yamazaki | ......... | G02F 1/133603 349/67 |
| 2011/0096265 A1* | 4/2011 | Murakoshi | ........ | G02F 1/133603 349/64 |
| 2011/0235318 A1* | 9/2011 | Simon | ...................... | F21K 9/17 362/217.05 |
| 2011/0280003 A1* | 11/2011 | Hsu | .................. | G02F 1/133603 362/97.1 |

FOREIGN PATENT DOCUMENTS

| | | |
|---|---|---|
| JP | 2011-175785 A | 9/2011 |
| KR | 10-0888898 B1 | 3/2009 |

* cited by examiner

*Primary Examiner* — Alexander Garlen
(74) *Attorney, Agent, or Firm* — Sughrue Mion, PLLC

(57) ABSTRACT

A display device is provided. The display device includes: a first display panel and a second display panel; and a backlight between the first display panel and the second display panel, wherein the backlight includes at least one Printed Circuit Board (PCB), and a plurality of Light Emitting Diodes (LEDs) arranged on different faces of the PCB and configured to supply light to both the first display panel and the second display panel located on different sides of the backlight.

11 Claims, 3 Drawing Sheets

DOUBLE-SIDED EMISSION TYPE DISPLAY DEVICE

CROSS-REFERENCE TO RELATED APPLICATION

This application claims priority from Korean Patent Application No. 10-2014-0027983, filed on Mar. 10, 2014 in the Korean Intellectual Property Office, the entire disclosure of which is hereby incorporated by reference in its entirety.

TECHNICAL FIELD

Apparatuses and methods consistent with exemplary embodiments relate to a display device with screens on both sides.

BACKGROUND

Display devices, such as televisions or monitors, display received signals as images.

A related art display device with screens on both sides includes first and second display panels separately arranged, and first and second backlight units arranged behind the first and second display panels, respectively, for illuminating the first and second display panels, respectively.

Since the first and second backlight units are arranged between the first and second display panels, a certain gap between the first and second display panels is needed to contain the two backlight units.

SUMMARY

Aspects of one or more exemplary embodiments provide a slim display device.

According to an aspect of an exemplary embodiment, there is provided a display device including: a first display panel and a second display panel arranged separately from each other; and a backlight between the first display panel and the second display panel and configured to supply light to the first display panel and the second display panel, wherein the backlight includes at least one Printed Circuit Board (PCB), and a plurality of Light Emitting Diodes (LEDs) arranged on different faces of the PCB, and wherein a first plurality of LEDs, among the plurality of LEDs, on a first face of the at least one PCB and a second plurality of LEDs, among the plurality of LEDs, on a second face of the at least one PCB are arranged to not overlap one another.

The first plurality of LEDs on the first face of the at least one PCB may be equidistant from each other and the second plurality of LEDs on the second face of the at least one PCB may be equidistant from each other.

The at least one PCB may include a plurality of PCBs each shaped as a bar elongated in a first direction, and the plurality of PCBs may be parallel to each other in a second direction perpendicular to the first direction.

The backlight may further include a first chassis that covers the first face of the plurality of PCBs and a second chassis that covers the second face of the plurality of PCBs, and the first chassis may include a first plurality of through holes at locations that correspond to the first plurality of LEDs, and the second chassis may include a second plurality of through holes at locations that correspond to the second plurality of LEDs.

The backlight may further include a plurality of lenses respectively for the plurality of LEDs and configured to guide light generated from the plurality of LEDs, and the first plurality of through holes and the second plurality of through holes may each have a shape corresponding to the plurality of lenses.

The display device may further include: a middle mold configured to support outer edges of the first display panel, the second display panel, and the backlight; and a first spacer configured to keep the first display panel a first distance apart from the backlight, wherein the middle mold may include a second spacer configured to keep the second display panel a second distance apart from the backlight.

The display device may further include: a first case configured to maintain a position of the first display panel within the middle mold; and a second case configured to maintain a position of the second display panel within the middle mold.

The display device may further include: a plurality of first optical sheets between the first display panel and the backlight; and a plurality of second optical sheets between the second display panel and the backlight.

The plurality of first optical sheets and the plurality of second optical sheets may each include a diffuser sheet configured to diffuse light supplied from the backlight, a prism sheet having a prism pattern, and a protective sheet configured to protect the prism sheet.

According to an aspect of another exemplary embodiment, there is provided a display device including: a first display panel and a second display panel arranged separately from each other; and a backlight between the first display panel and the second display panel and configured to supply light to the first display panel and the second display panel, wherein the backlight includes a plurality of Printed Circuit Boards (PCBs) each shaped as a bar elongated in a first direction and arranged in parallel in a second direction perpendicular to the first direction, and a plurality of Light Emitting Diodes (LEDs) arranged on different sides of the plurality of PCBs, and wherein a first plurality of LEDs, among the plurality of LEDs, on a first face of the plurality of PCBs and a second plurality of LEDs, among the plurality of LEDs, on a second face of the plurality of PCBs are arranged to not overlap one another.

The first plurality of LEDs on the first face of the plurality of PCBs may be equidistant from each other, and the second plurality of LEDs on the second face of the plurality of PCBs may be equidistant from each other.

The backlight may further include a first chassis that covers the first face of the plurality of PCBs and a second chassis that covers the second face of the plurality of PCBs, and the first chassis may include a first plurality of through holes at locations that correspond to the first plurality of LEDs, and the second chassis may include a second plurality of through holes at locations that correspond to the second plurality of LEDs.

The backlight may further include a plurality of lenses respectively for the plurality of LEDs and configured to guide light generated from the plurality of LEDs, and the first plurality of through holes and the second plurality of through holes may each have a shape corresponding to the plurality of lenses.

The display device may further include: a middle mold configured to support outer edges of the first display panel, the second display panel, and the backlight; and a first spacer configured to keep the first display panel a first distance apart from the backlight, wherein the middle mold may include a second spacer configured to keep the second display panel a second distance apart from the backlight.

The display device may further include: a first case configured to maintain a position of the first display panel within the middle mold; and a second case configured to maintain a position of the second display panel within the middle mold.

According to an aspect of another exemplary embodiment, there is provided a display device including: a first display panel and a second display panel arranged separately from each other; and a backlight between the first display panel and the second display panel and configured to supply light to the first display panel and the second display panel, wherein the backlight includes at least one Printed Circuit Board (PCB), and a plurality of Light Emitting Diodes (LEDs) arranged on different faces of the PCB.

A first plurality of LEDs, among the plurality of LEDs, on the first face of the at least one PCB may be equidistant from each other and a second plurality of LEDs, among the plurality of LEDs, on the second face of the at least one PCB may be equidistant from each other.

The backlight may further include a first chassis that covers the first face of the at least one PCB and a second chassis that covers the second face of the at least one PCB, and the first chassis may include a first plurality of through holes at locations that correspond to a first plurality of LEDs, among the plurality of LEDs on the first face of the at least one PCB, and the second chassis may include a second plurality of through holes at locations that correspond to a second plurality of LEDs, among the plurality of LEDs on the second face of the at least one PCB.

The display device may further include: a middle mold configured to support outer edges of the first display panel, the second display panel, and the backlight; and a first spacer configured to keep the first display panel a first distance apart from the backlight, wherein the middle mold may include a second spacer configured to keep the second display panel a second distance apart from the backlight.

The display device may further include: a first case configured to maintain a position of the first display panel within the middle mold; and a second case configured to maintain a position of the second display panel within the middle mold.

Other aspects, advantages, and salient features will become apparent to those skilled in the art from the following detailed description, which, taken in conjunction with the annexed drawings, discloses exemplary embodiments.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
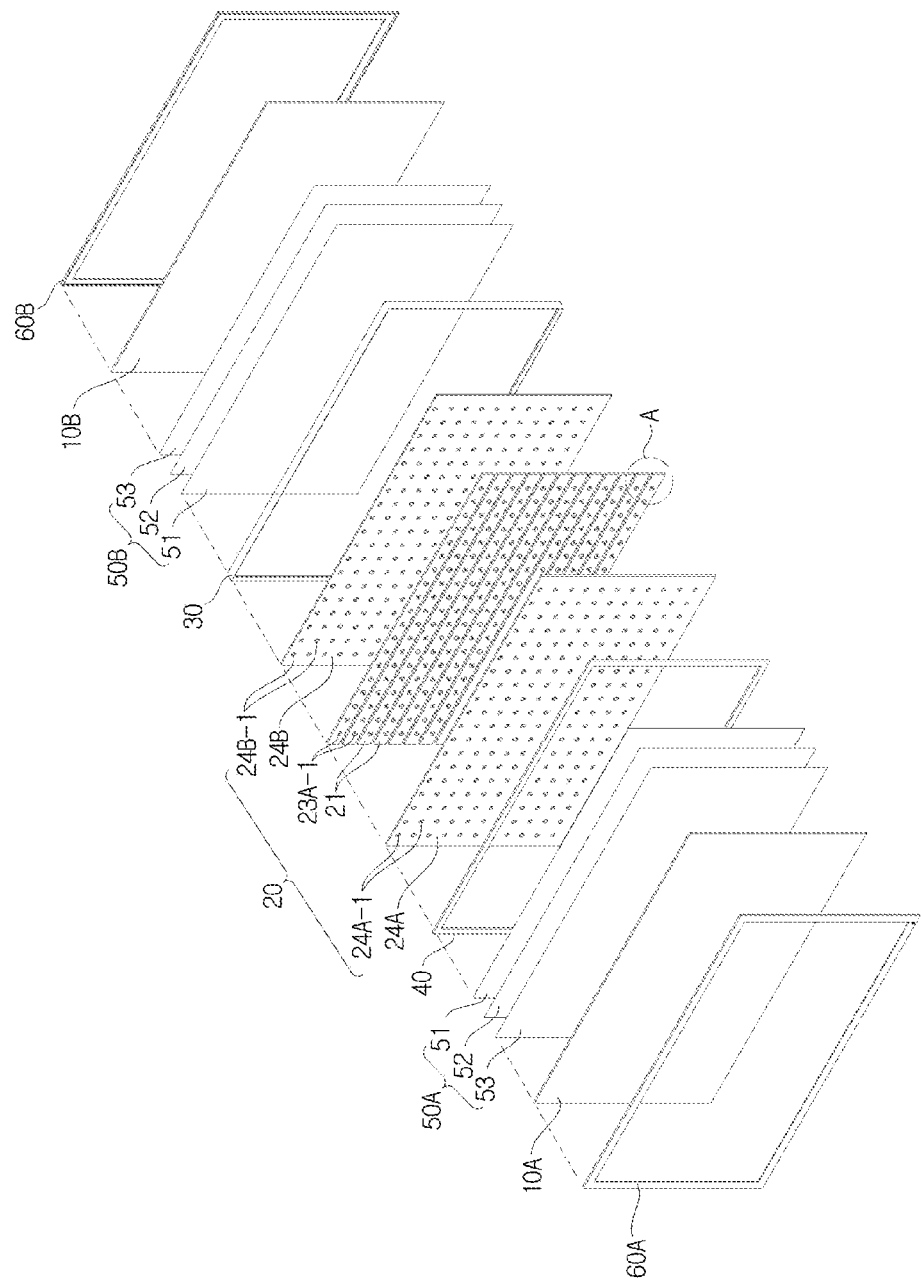
FIG. 1 is an exploded view of a display device, according to an exemplary embodiment.

The present disclosure will now be described more fully with reference to the accompanying drawings, in which exemplary embodiments are shown. Exemplary embodiments may, however, be embodied in many different forms and should not be construed as being limited to the exemplary embodiments set forth herein; rather, these exemplary embodiments are provided so that this disclosure will be thorough and complete, and will fully convey the concept of the disclosure to those skilled in the art. Like reference numerals in the drawings denote like elements, and thus their description will be omitted. In the description of the present disclosure, if it is determined that a detailed description of commonly-used technologies or structures related to exemplary embodiments may unnecessarily obscure the subject matter of exemplary embodiments, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference will now be made in detail to embodiments, examples of which are illustrated in the accompanying drawings. Hereinafter, expressions such as "at least one of," when preceding a list of elements, modify the entire list of elements and do not modify the individual elements of the list.

Figure 2:
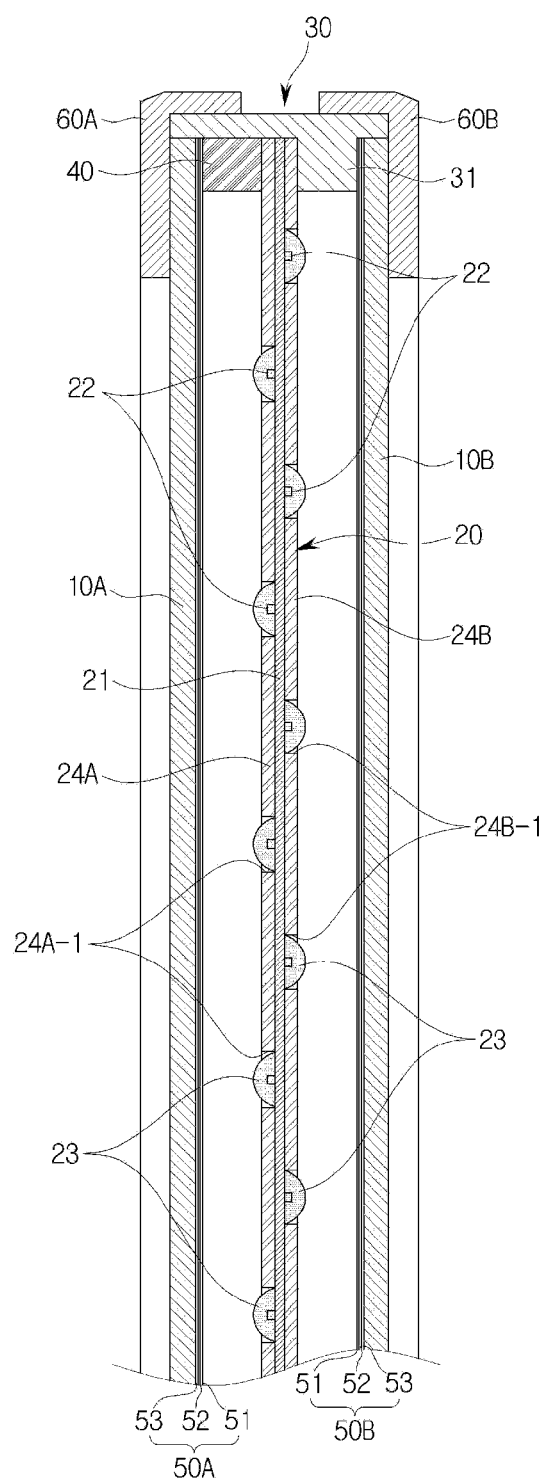
FIG. 2 is a cross-sectional view of a display device, according to an exemplary embodiment.
Figure 3:
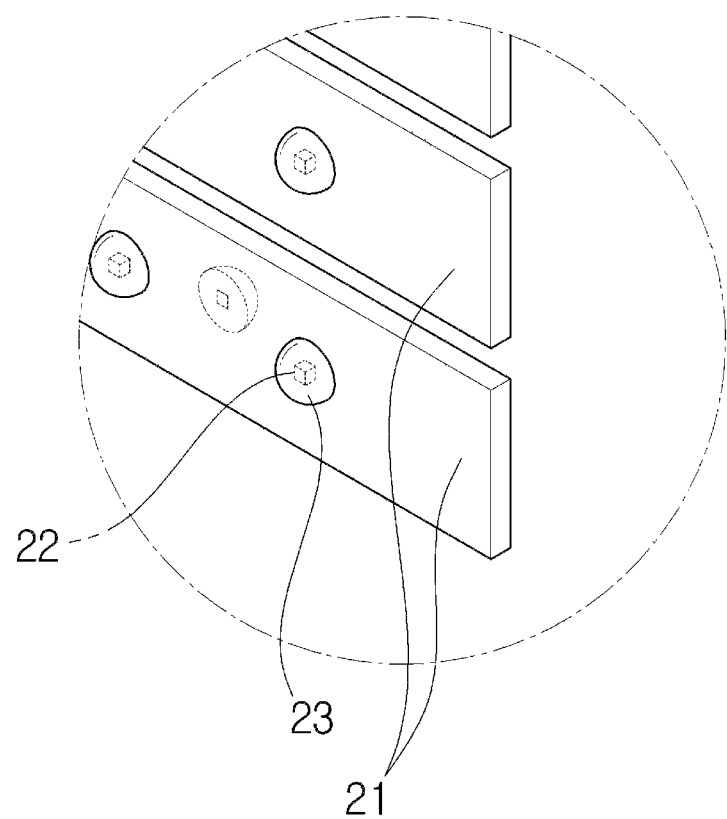
FIG. 3 is an enlarged view of portion A of FIG. 1.

FIG. 1 is an exploded view of a display device, according to an exemplary embodiment. FIG. 2 is a cross-sectional view of a display device, according to an exemplary embodiment. FIG. 3 is an enlarged view of portion A of FIG. 1.

Referring to FIGS. 1 and 2, the display device may include: a first display panel 10A and a second display panel 10B separately arranged in parallel; a backlight unit 20 (e.g., backlight) to supply light to the first display panel 10A and the second display panel 10B; a middle mold 30 to support outer edges of the first display panel 10A, the second display panel 10B, and the backlight unit 20; and a first case 60A and a second case 60B to maintain the position of the first display panel 10A and the second display panel 10B installed (e.g., provided) within the middle mold 30, respectively.

The first display panel 10A and the second display panel 10B may each be formed of (e.g., include) a Liquid Crystal Display (LCD) panel, and may be separately arranged in parallel.

The backlight unit 20 may be arranged between the first display panel 10A and the second display panel 10B to supply light to both the display panels 10A and 10B such that screens appear visible on the first display panel 10A and the second display panel 10B.

As shown in FIG. 3, the backlight unit 20 may include at least one Printed Circuit Board (PCB) 21, a plurality of light emitting diodes (LEDs) 22 mounted on the PCB 21, and a plurality of lenses 23 arranged for the plurality of LEDs in a half-sphere shape for guiding light generated from the plurality of LEDs 22.

In the present exemplary embodiment, as shown in FIGS. 1 and 2, each PCB 21 may each be shaped as a bar that is elongated in a first direction. Furthermore, a plurality of PCBs 21 may be separately arranged in parallel in a second direction perpendicular to the first direction.

The backlight unit 20 may also include a first chassis 24A and a second chassis 24B, each formed (e.g., provided) as a flat board to support the PCBs 21.

The first chassis 24A may be installed (e.g., provided) to cover a first face of the PCBs 21 that faces the first display panel 10A, and the second chassis 24B may be installed to cover a second face of the PCBs 21 that faces the second display panel 10B. For the light generated from the LEDs 22 to be propagated through the first chassis 24A and the second chassis 24B to the first display panel 10A and the second display panel 10B, respectively, through holes 24A-1, 24B-1 may be provided at locations corresponding to the LEDs 22. In the present exemplary embodiment, since lenses 23 are placed over the LEDs 22 one by one, the through holes 24A-1, 24B-1 may be formed to correspond to the lenses 23.

In addition, the first chassis 24A and the second chassis 24B may be formed of (e.g., include) a metal that serves to dissipate heat generated from the LEDs 22.

The LEDs 22 placed on the first face and the second face of the PCB 21 (e.g., first plurality of LEDs on the first face and second plurality of LEDs on the second face) may be arranged in a pattern so as not to overlap with each other (i.e., to cross one another) to prevent heat generated from two LEDs 22 arranged on either sides of the PCB 21 from concentrating on the portion of the PCB 21 between the two LEDs, as compared to an occasion where two LEDs are arranged to correspond to each other (i.e., overlap with each other) on opposing sides of the PCB 21, causing heat generated from the LEDs to concentrate on the portion of the PCB therebetween and not to be smoothly dissipated.

In the present exemplary embodiment, the LEDs 22 may be arranged on the first face and the second face of the PCB 21 such that the LEDs 22 on the first face are equidistant from each other and the LEDs 22 on the second face are equidistant from each other.

The middle mold 30 may be shaped as a rectangle and include a spacer 31 (e.g., second spacer) that juts out to support one side of the backlight unit 20 while keeping the backlight unit 20 a second (e.g., predetermined) distance apart from the second display panel 10B.

Inside the middle mold 30, another spacer 40 (e.g., first spacer) is installed between end parts of the backlight unit 20 and first display panel 10A for keeping the first display panel 10A a first (e.g., predetermined) distance apart from the backlight unit 20. Here, the first distance and the second distance may be the same or different.

Furthermore, between the backlight unit 20 and the first display panel 10A or the second display panel 10B, there may be optical sheets 50A, 50B to enhance properties of optical light supplied from the backlight unit 20.

The optical sheets 50A, 50B may include first optical sheets 50A arranged behind the first display panel 10 and second optical sheets 50B arranged behind the second display panel 10B. The first optical sheets 50A and the second optical sheets 50B may each include a diffuser sheet 51 for diffusing light supplied from the backlight unit 20, a prism sheet 52 for enabling the light diffused by the diffuser sheet 51 to be condensed in a forward direction perpendicular to the first display panel 10A or the second display panel 10B with its prism pattern, and a protective sheet 53 arranged ahead of the prism sheet 52 for protecting the prism sheet 52 against dirt, scratches, etc.

While the PCB 21 has a shape of multiple bars in the above-described exemplary embodiment, it is understood that one or more other exemplary embodiments are not limited thereto. For example, according to another exemplary embodiment, it is possible to form the PCB as a single flat board with the LEDs on the first and second faces of the PCB crossing each other.

According to exemplary embodiments, a display device may be more slimly formed with a PCB having LEDs arranged on both faces of the PCB for illuminating a first display panel and a second display panel located respectively on both sides of the PCB. Furthermore, the display device may prevent heat generated from the LEDs from concentrating on a certain portion of the PCB by arranging the LEDs to cross one another on a first face and a second face of the PCB.

Several exemplary embodiments have been described above, but a person of ordinary skill in the art will understand and appreciate that various modifications can be made without departing the scope of the present inventive concept. Thus, it will be apparent to those ordinary skilled in the art that the true scope of technical protection is defined by the following claims.

What is claimed is:

1. A display device comprising:
 a first display panel and a second display panel arranged separately from each other; and
 a backlight between the first display panel and the second display panel and configured to supply light to the first display panel and the second display panel,
 wherein the backlight comprises:
 at least one Printed Circuit Board (PCB) shaped as a bar;
 a plurality of Light Emitting Diodes (LEDs) arranged on different faces of the PCB;
 a first chassis that covers the first face of the at least one PCB and a second chassis that covers the second face of the at least one PCB; and
 a plurality of lenses respectively for the plurality of LEDs and configured to guide light generated from the plurality of LEDs,
 wherein a first plurality of LEDs, among the plurality of LEDs, on a first face of the at least one PCB and a second plurality of LEDs, among the plurality of LEDs, on a second face of the at least one PCB are arranged to not overlap one another,
 wherein the first chassis comprises a first plurality of through holes at locations that correspond to the first plurality of LEDs, and the second chassis comprises a second plurality of through holes at locations that correspond to the second plurality of LEDs,
 wherein the first plurality of through holes and the second plurality of through holes each have a shape corresponding to the plurality of lenses and each have a diameter larger than or equal to a diameter of the plurality of lenses, and
 wherein the first chassis and the second chassis are flat boards that support the at least one PCB.

2. The display device of claim 1, wherein the first plurality of LEDs on the first face of the at least one PCB are equidistant from each other and the second plurality of LEDs on the second face of the at least one PCB are equidistant from each other.

3. The display device of claim 1, wherein:
 the at least one PCB comprises a plurality of PCBs each shaped as a bar elongated in a first direction; and
 the plurality of PCBs are parallel to each other in a second direction perpendicular to the first direction.

4. The display device of claim 1, further comprising:
 a middle mold configured to support outer edges of the first display panel, the second display panel, and the backlight; and
 a first spacer configured to keep the first display panel a first distance apart from the backlight,
 wherein the middle mold comprises a second spacer configured to keep the second display panel a second distance apart from the backlight.

5. The display device of claim 4, further comprising:
 a first case configured to maintain a position of the first display panel within the middle mold; and
 a second case configured to maintain a position of the second display panel within the middle mold.

6. The display device of claim 1, further comprising:
 a plurality of first optical sheets between the first display panel and the backlight; and a plurality of second optical sheets between the second display panel and the backlight.

7. The display device of claim 6, wherein the plurality of first optical sheets and the plurality of second optical sheets each comprise a diffuser sheet configured to diffuse light supplied from the backlight, a prism sheet having a prism pattern, and a protective sheet configured to protect the prism sheet.

8. A display device comprising:
a first display panel and a second display panel arranged separately from each other; and
a backlight between the first display panel and the second display panel and configured to supply light to the first display panel and the second display panel,
wherein the backlight comprises:
a plurality of Printed Circuit Boards (PCBs) each shaped as a bar elongated in a first direction and arranged in parallel in a second direction perpendicular to the first direction;
a plurality of Light Emitting Diodes (LEDs) arranged on different sides of the plurality of PCBs;
a first chassis that covers the first face of the plurality of PCBs and a second chassis that covers the second face of the plurality of PCBs; and
a plurality of lenses respectively for the plurality of LEDs and configured to guide light generated from the plurality of LEDs,
wherein a first plurality of LEDs, among the plurality of LEDs, on a first face of the plurality of PCBs and a second plurality of LEDs, among the plurality of LEDs, on a second face of the plurality of PCBs are arranged to not overlap one another,
wherein the first chassis comprises a first plurality of through holes at locations that correspond to the first plurality of LEDs, and the second chassis comprises a second plurality of through holes at locations that correspond to the second plurality of LEDs,
wherein the first plurality of through holes and the second plurality of through holes each have a shape corresponding to the plurality of lenses and each have a diameter larger than or equal to a diameter of the plurality of lenses, and
wherein the first chassis and the second chassis are flat boards that support the plurality of PCBs.

9. The display device of claim 8, wherein the first plurality of LEDs on the first face of the plurality of PCBs are equidistant from each other, and the second plurality of LEDs on the second face of the plurality of PCBs are equidistant from each other.

10. The display device of claim 8, further comprising:
a middle mold configured to support outer edges of the first display panel, the second display panel, and the backlight; and
a first spacer configured to keep the first display panel a first distance apart from the backlight,
wherein the middle mold comprises a second spacer configured to keep the second display panel a second distance apart from the backlight.

11. The display device of claim 10, further comprising:
a first case configured to maintain a position of the first display panel within the middle mold; and
a second case configured to maintain a position of the second display panel within the middle mold.

* * * * *